INVENTOR:
OTTO B. SCHOENFELD

United States Patent Office 2,693,880
Patented Nov. 9, 1954

2,693,880

EMULSION SEPARATOR

Otto B. Schoenfeld, Houston, Tex.

Application January 21, 1952, Serial No. 267,465

5 Claims. (Cl. 210—52.5)

This invention pertains to emulsion separation and more particularly to separating out the water from an oil-water emulsion constituting the natural fluid taken from a petroleum well. It is to be understood that the water phase of such an emulsion may not be pure water, for example it is oftentimes salt water or brine, and that as used herein the term water is intended to cover such impure fluid. Likewise the term oil as used herein is intended to cover impure oils and oils of varying composition. Although the invention is of general application to the separation of an emulsion formed of two immiscible liquid fractions of different densities, for purposes of illustration the invention will be described in connection with the separation of oil and water.

It is an object of the invention to provide a method and apparatus for emulsion separation which will effect more nearly perfect emulsion separation.

It is a further object of the invention to provide a method and apparatus for emulsion separation which can process the emulsion at a higher rate for a given size apparatus.

It is a further object of the invention to provide a method and apparatus for emulsion separation which is more economical as to initial cost, cost of operation, and cost of maintenance and repair.

It is further object of the invention to provide a separator that is easily cleaned and a method of easily cleaning such a separator.

Other objects and advantages of the invention will appear from the following description of a preferred embodiment thereof.

According to the method of the invention emulsion which comprises a continuous oil phase and a dispersed water phase is introduced into a body of water beneath the interface between the body of water and an emulsion resting on the water, the latter emulsion being of higher oil concentration than the first. Because the first mentioned emulsion is lighter than the water, it rises through the water into contact with the lower surface of the higher oil concentration emulsion. This surface has a relatively large radius of curvature, that is, it is substantially a plane surface. The first mentioned emulsion on the other hand, breaks up during its upward travel through the water into globules of relatively small radius of curvature. Because of the similarity to the break up of falling liquid into drops, the globules of emulsion will be called drops although they are rising, not falling. As the drops merge or coalesce with the higher oil concentration emulsion at the lower surface thereof, they flatten out and the water dispersed within each of the emulsion drops is thus deposited in the larger body of higher oil concentration emulsion at a point extremely close to the lower surface thereof, and since the dispersed water is heavier than the oil it tends to fall out through this lower surface and is only retained by the surface tension of the oil. As this process is continued the water resting on the lower surface of the higher oil concentration emulsion finally collects in such quantity as to first distort the surface downwardly and finally break therethrough into the water below. This maintains the static emulsion of higher oil concentration than the rising drops. As the quantity of higher oil concentration emulsion increases, the excess over the original amount is removed and introduced into the water beneath the interface with a body of still higher oil concentration emulsion. This is repeated at a plurality of interfaces until the oil leaving the last interface is nearly perfectly free of water. The emulsion at each emulsion-water interface is heated to assist in separating the water by lowering the surface tension of the oil.

An apparatus for carrying out the method embodying the invention is shown in the accompanying drawings wherein.

Figure 1:
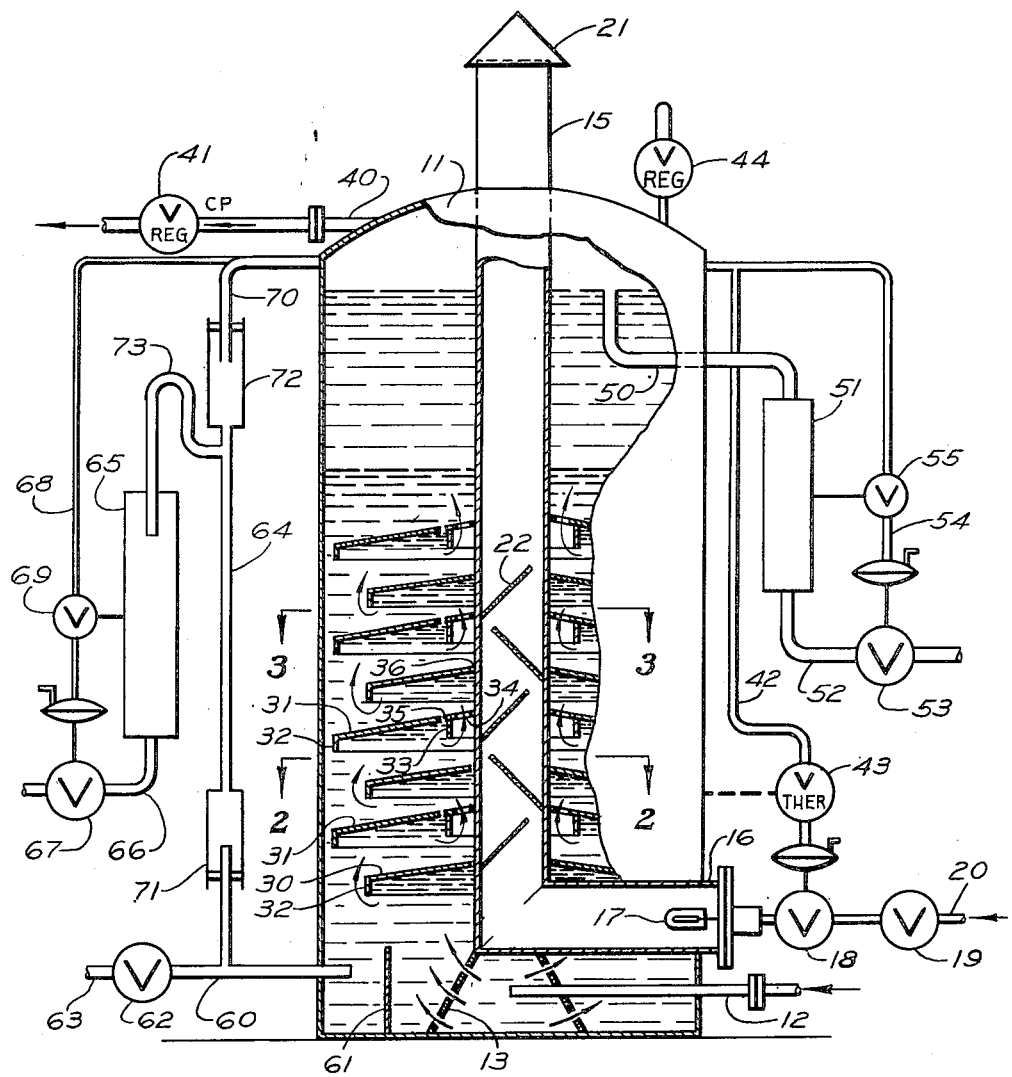
Figure 1 is a vertical section through a separator embodying the invention.

Referring to Figure 1 there is shown a separator comprising a cylindrical metal tank 11 having an emulsion inlet pipe 12 entering near the bottom thereof. A conical spreader 13 is disposed around the inner end of the inlet pipe. There are plurality of holes through the spreader so that emulsion passing therethrough is broken up into drops.

The spreader is centrally disposed on the bottom of the tank and resting on top of the spreader is a flue comprising vertical metal pipe 15 and radial pipe 16. A gas burner 17 is disposed in the radial pipe, being supplied with gas through diaphragm actuated valve 18 and manual valve 19 from gas inlet pipe 20. Hot gas from the burner passes up through pipe 15 and out through its top under cap 21. Baffles 22 inside pipe 15 lengthen the path of the gas through the pipe 15 to provide maximum heat transfer to the pipe 15.

Around the pipe 15 are a plurality of receivers or traps comprising annular conical metal sheets or plates of two types alternately placed, one type as shown at 30 having a smaller outer diameter and the other type as shown at 31 having a larger outer diameter. The plates are disposed with their concave surfaces beneath and their convex surfaces on top.

Figure 2:
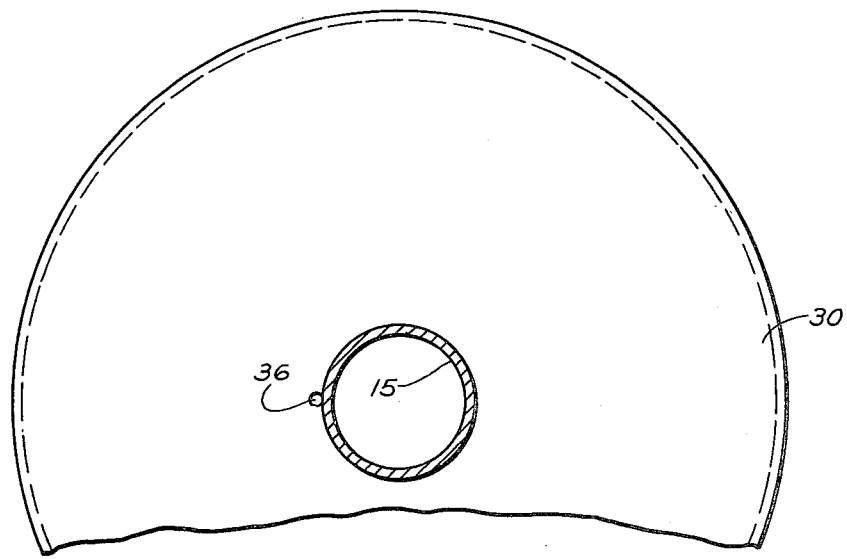
Figures 2 and 3 are plan views of baffles used in the apparatus of Figure 1.
Figure 3:
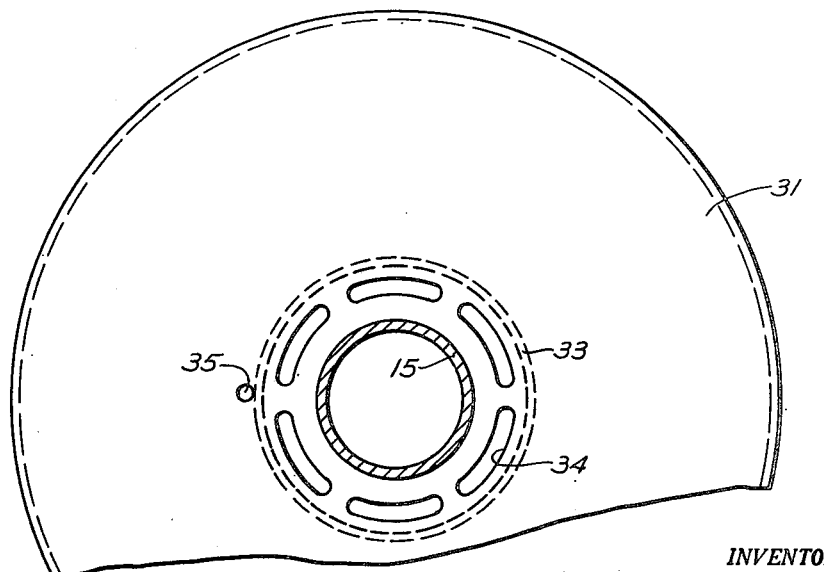

A depending skirt or flange such as shown at 32 is disposed around the outer edge of each plate. The larger diameter plates are also each provided with an interiorly disposed collar as shown at 33 whose lower end terminates above the level of the lower edge of skirt 32. The portion of each plate 31 between pipe 15 and collar 33 is provided with a number of apertures such as 34 (see also Figure 3). A vent hole 35 is provided in the top of each plate 31 adjacent skirt 33 and vent hole 36 is provided in the top of each plate 30 adjacent pipe 15 (see also Figures 3 and 2).

Emulsion rising from spreader 13 is broken up into drops, is then caught by the lowermost trap plate 30, merges with the emulsion already trapped there, and then escapes or "overflows" beneath the skirt 32 in the direction indicated by the arrow. The excess overflowing beneath the inverted weir constituted by the skirt 32 breaks up into drops, is then caught beneath the larger diameter trap plate 31 near the outer edge thereof, merges with the emulsion already trapped there and then escapes beneath collar 33, again breaks up into drops and passes up between collar 33 and pipe 15 through apertures 34, as indicated by the arrows. The emulsion is then caught beneath the next smaller diameter trap plate 30 near the inner portion thereof, merges with the emulsion already trapped there, and then escapes beneath the skirt 32 at the outer edge of the trap where it again breaks up into drops. This process is repeated until finally the emulsion escapes from the uppermost trap plate and rises to the top of the tank. By the time the emulsion reaches the top of the tank most of the water has fallen out of it and the liquid at the top of the tank is substantially water-free oil floating on top of the water freed therefrom.

Gas entrained with the emulsion and separating therefrom will rise to the top of the tank above the oil. This gas is bled off through gas outlet pipe 40 and back pressure regulating valve 41 maintaining a predetermined pressure in the tank. If desired the tank pressure can be atmospheric but by maintaining a slight pressure the gas can be used for motivating various diaphragm actuated valves used to control the separator. For example the diaphragm of heater gas supply valve 18 can be supplied through pipe 42. A valve 43 in this line is responsive to temperature or pressure conditions inside the separator to regulate the heater gas supply so as to maintain the desired temperature inside the separator, which will be below the boiling point of the water and the normally liquid hydrocarbons of the oil but which will be fairly close to such boiling point. A safety valve 44 is provided in the top of the tank to prevent buildup of excess pressure.

Oil in the top of the tank will be removed by pipe 50 whose open upper end is placed at the level at which the oil upper surface is desirably maintained. Pipe 50 connects to a receiver 51 which drains continuously or periodically through pipe 52 under the control of diaphragm actuated valve 53. Motivating fluid for the diaphragm of valve 53 is supplied from the tank or other suitable source through pipe 54 controlled by valve 55 which is opened and closed by a float mechanism on the receiver 51 to open the valve 55 as the receiver gets full.

Beneath the oil outlet is a water outlet pipe 60 which preferably is near the bottom of the tank beneath the trap plates. A partition plate 61 extends across the bottom of the tank to form a quiet zone at one side thereof adjacent the inner end of pipe 60 so that the emulsion entering the tank will not be disturbed by the water leaving it. A manual valve 62 is provided for rapid draining of the tank through pipe 63 connected to pipe 60, but normally valve 62 is closed and water is removed through pipe 64 connected to pipe 60 and a receiver 65. Receiver 65 is drained continuously or periodically through pipe 66 controlled by diaphragm actuated valve 67. The diaphragm is motivated by gas from pipe 68 connected to the top of the tank or other suitable source. Valve 69 in pipe 68 is controlled by a float mechanism in the receiver to open and close the valve as the water level in the receiver rises and falls.

Pipe 64 is also connected to the top of the tank by pipe 70. The water level maintained in pipe 64 determines the level of the oil-water interface in the tank since the water in pipe 64 must balance the combined head of oil and water in the tank. Telescopic joints 71 and 72 permit adjustment of the pipe 64 so that the level of the top of its outlet 73 to the receiver can be varied as desired.

In operation of the separator, tank 11 is first filled with water from any suitable source to a level above the uppermost trap. This can be done merely by feeding emulsion to the tank for a long enough time for free water entrained therewith or dispersed water separating therefrom to collect in the bottom of the tank. If the tank is first filled with water, emulsion is thereafter fed to the tank. In either case, some of the emulsion is caught and retained beneath each trap. Initially all the emulsion is of the same oil concentration. Later, after the apparatus has been operated for a while, the emulsion beneath the traps becomes of higher oil concentration as water separates out, and that beneath each successive trap going upwardly is of still higher oil concentration since it is constantly being replaced with emulsion from below from which some water has already been removed and since additional water is removed beneath each trap. The emulsion admitted to the tank follows the path of the arrows on the drawing, being broken up into drops each time it rises through the water after overflowing the spreader or the edges of the traps and thereafter merging with higher oil concentration emulsion beneath each trap where its dispersed water is deposited close to the interface so as to continually break through to the continuous water phase below the interface. In addition, although this is not essential, heat from the flue is conducted to the traps and thence to the emulsion underneath and heats the emulsion as it travels through the apparatus, thereby lowering the surface tension of the oil to speed up the separation.

The traps in the tank serve not only to catch and retain the emulsion drops but have a damping effect on the system preventing or reducing surges. Gas is prevented from accumulating under the traps by means of the vents 35, 36, which are preferably quite small to prevent much or any emulsion from flowing therethrough.

The entire separator can be cleaned of wax, grease, and other solids by first disconnecting the tank from service and heating it up until the solids melt. The convex top surfaces of the trap cause the melted solids to run off to the bottom of the tank where they can be removed through a suitable drain (not shown) in the bottom of the tank.

Summarizing, the invention contemplates the separation of dispersed water from an oil-water emulsion by (1) bringing the water near to the lower surface of the emulsion where it has a greater chance to break through under the influence of gravity, this being done by breaking the emulsion into drops and then adding the drops to the lower surface of an emulsion body, (2) lowering the effective surface tension of the oil at said surface, this being done by flattening the surface, heating the oil, and placing the surface in contact with water in continuous phase, and (3) repeating the process a number of times to secure a high degree of purity.

While a preferred embodiment of the invention has been shown and described, it is obvious that many modifications thereof can be made by one skilled in the art without departing from the spirit of the invention and it is intended to protect by Letters Patent all forms of the invention falling within the scope of the following claims.

I claim:

1. Apparatus for separating heavy liquid and light liquid fractions of an emulsion comprising a liquid receptacle, means to admit emulsion to the receptacle, means to let out light liquid from the receptacle above the level of said emulsion admission means, a plurality of means in said receptacle disposed in the path between said emulsion admission means and said means to let out light liquid to catch and retain liquid rising in said receptacle, said plurality of means being spaced apart along said path, means to guide liquid rising in said receptacle into the one of said plurality of means disposed immediately thereabove along said path after spilling up past the one of said means therebelow, means to guide the liquid in each one of said plurality of means to spill up past said one of said plurality of means at a point on the opposite side of said path from the point at which the liquid spills up past the one said plurality of means immediately thereabove, each of said plurality of means comprising a metal wall, metallic means in contact with the metal wall of each of said plurality of means to supply heat thereto from a source outside of said receptacle, means to let out gas from the upper part of each of said liquid catching and retaining means, and means to let out heavy liquid from said receptacle below the level of said means to let out light liquid.

2. An oil-water emulsion separator comprising a cylindrical tank, a cylindrical pipe passing through said tank along the axis of the tank, a plurality of traps each comprising an annular conical plate secured to said pipe inside said tank spaced apart along the axis of said pipe with the concave sides of the plates down and their convex sides up in the normal position of use of the separator, alternate ones of said traps having a smaller diameter and the remainder of said traps having a larger diameter, each of said larger diameter traps having a passage therethrough adjacent said pipe, a wall around each said passage extending therebelow but only to a point above the level of the outer periphery of the trap, the top of each trap having a gas vent therethrough, said vents being between said wall and the outer periphery of said larger diameter traps and between said pipe and the outer periphery of said smaller diameter traps, an inlet to said tank below said traps an outlet from said tank above said traps, and another outlet from said tank below the first said outlet.

3. The combination of claim 2 in which each trap includes a downwardly extending skirt around the outer periphery of the conical plate, and said wall is a collar surrounding and spaced from said pipe.

4. The combination of claim 2 in which there are a plurality of baffles disposed inside said pipe forming a fluid passage through said pipe that is longer than the axis of said pipe.

5. The combination of claim 2 in which there is a pipe having its axis disposed radially with respect to the tank axis, the radial pipe connecting to the axial pipe near the bottom of the tank, and in which there is a conical support for said pipes disposed with its axis in alignment with said vertical pipe and resting on the bottom of the tank around said inlet, said support having a plurality of apertures therethrough.

(References on following page)

References Cited in the file of this patent

UNITED STATES PATENTS

| Number | Name | Date |
|---|---|---|
| Re. 20,227 | Gordon | Jan. 5, 1937 |
| 554,815 | Field | Feb. 18, 1896 |
| 1,392,758 | Glair | Oct. 4, 1921 |
| 1,402,411 | Franke | Jan. 3, 1922 |
| 1,450,750 | Putnam | Apr. 3, 1923 |
| 1,528,427 | Clark et al. | Mar. 3, 1925 |
| 1,716,934 | Smith | June 11, 1929 |
| 1,869,758 | Lungstras | Aug. 2, 1932 |
| 1,940,762 | Mahone | Dec. 26, 1933 |
| 2,009,510 | Mobley | July 30, 1935 |
| 2,043,379 | Justus | June 9, 1936 |
| 2,167,160 | Raymond | July 25, 1939 |

FOREIGN PATENTS

| Number | Country | Date |
|---|---|---|
| 142,703 | Great Britain | May 13, 1920 |